(12) United States Patent
Okabe (10) Patent No.: US 11,155,261 B2
(45) Date of Patent: Oct. 26, 2021

(54) VEHICLE CONTROL DEVICE, VEHICLE CONTROL METHOD, AND RECORDING MEDIUM

(71) Applicant: PANASONIC INTELLECTUAL PROPERTY MANAGEMENT CO., LTD., Osaka (JP)

(72) Inventor: Yoshimasa Okabe, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 325 days.

(21) Appl. No.: 16/291,702

(22) Filed: Mar. 4, 2019

(65) Prior Publication Data

US 2019/0276019 A1     Sep. 12, 2019

(30) Foreign Application Priority Data

Mar. 9, 2018    (JP) .............................. JP2018-043552

(51) Int. Cl.
    *B60W 30/14*      (2006.01)
    *B60W 50/14*      (2020.01)
    *E05B 77/12*      (2014.01)

(52) U.S. Cl.
CPC .......... *B60W 30/146* (2013.01); *B60W 50/14* (2013.01); *E05B 77/12* (2013.01); *B60W 2530/18* (2013.01); *B60W 2540/12* (2013.01); *B60W 2552/05* (2020.02); *B60W 2720/10* (2013.01); *E05Y 2900/531* (2013.01)

(58) Field of Classification Search
CPC .......... B60W 30/146; B60W 2530/18; B60W 2720/10; B60W 2030/082; B60W 50/14; B60W 2552/05; B60W 2756/10; B60R 21/0136; E05B 77/12
See application file for complete search history.

(56) References Cited

U.S. PATENT DOCUMENTS

| | | | |
|---|---|---|---|
| 9,773,281 B1 * | 9/2017 | Hanson | G06Q 40/08 |
| 2015/0006053 A1 | 1/2015 | Hammoud et al. | |
| 2016/0144817 A1 * | 5/2016 | Chambers | G08G 1/205 340/436 |

FOREIGN PATENT DOCUMENTS

| | | |
|---|---|---|
| EP | 1839961 A1 | 10/2007 |
| JP | 2002-354602 | 12/2002 |

OTHER PUBLICATIONS

Chinese Office Action dated Apr. 22, 2021 issued in Chinese patent application No. 201910173444.8 along with corresponding English translation.

* cited by examiner

*Primary Examiner* — Genna M Mott
(74) *Attorney, Agent, or Firm* — Greenblum & Bernstein, P.L.C.

(57) ABSTRACT

A vehicle control device receives a collision detection signal indicating that a vehicle collides with an object from a collision detection device. The vehicle control device measures a distance that the vehicle moves from a collision point when the collision detection signal is received. The vehicle control device limits a running of the vehicle when the movement distance from the collision point exceeds a predetermined threshold value, and does not limit the running of the vehicle when the movement distance from the collision point is the predetermined value or less.

19 Claims, 4 Drawing Sheets

//  VEHICLE CONTROL DEVICE, VEHICLE CONTROL METHOD, AND RECORDING MEDIUM

BACKGROUND

1. Field

The present disclosure relates to a data processing technology, and more particularly, to a technology of controlling a vehicle.

2. Description of the Related Art

In case of car rampage due to terrorism or the like, a large number of casualties may occur. In some vehicles, when a collision is detected, power is shut off and the vehicle is forcibly stopped.

[Patent Literature 1] Jpn. Pat. Appln. KOKAI Publication No. 2002-354602

When the vehicle is forcibly stopped when the collision occurs, the car rampage can be stopped, but if the vehicle is in a danger zone such as a railroad crossing, it may be difficult to escape from the danger zone.

SUMMARY

The present disclosure has been made in view of the above circumstances, and an object of the present disclosure is to provide a technology of properly limiting a running of a vehicle.

In order to solve the problem, according to one aspect of the present invention, a vehicle control device includes: a receiver structured to receive a detection signal indicating that a vehicle collides with an object from a collision detection device mounted in the vehicle, a monitor structured to measure a distance that the vehicle moves from a collision point when the receiver receives the detection signal, and a controller structured to limit a running of the vehicle when the distance measured by the monitor exceeds a predetermined threshold value, and not to limit the running of the vehicle when the distance is the threshold value or less.

According to another aspect of the present invention, a vehicle control method is provided. The method executed by a computer includes: receiving a detection signal indicating that a vehicle collides with an object from a collision detection device mounted in the vehicle, measuring a distance that the vehicle moves from a collision point when the detection signal is received, and limiting a running of the vehicle when the movement distance exceeds a predetermined threshold value, and not limiting the running of the vehicle when the movement distance is the threshold value or less.

Further, it is also effective as one aspect of the present disclosure that an arbitrary combination of the above components and conversion of the expression of the present disclosure between a system, a computer program, a recording medium on which a computer program is recorded, a vehicle equipped with the device, and the like.

DETAILED DESCRIPTION

The invention will now be described by reference to the preferred embodiments. This does not intend to limit the scope of the present invention, but to exemplify the invention.

First, an outline of the embodiment will be described. Nowadays, there are car rampage accidents (or car rampage incidents) of a vehicle in the world, and everyone can become a perpetrator or a victim of the car rampage accident. In the case in which the vehicles equipped with an automatic brake system are popular, the possibility of the car rampage accident is reduced, but the automatic brake system using cameras, radar, or the like is costly. In addition, in the case in which the vehicle is forcibly stopped by a detection of a collision, it may be difficult to escape from a danger zone when the vehicle is in the danger zone such as a railroad crossing. In addition, in the case in which the vehicle is forcibly stopped by the detection of the collision, it is difficult to perform so-called French Parking (in other words, very tight parallel parking with little gap between bumper to bumper), in which a space for parking or departure is secured by repeating an operation of pushing and moving another vehicle using a bumper (i.e., collision with another vehicle).

The apparatus of controlling a vehicle according to one embodiment allows the vehicle to repeat the movement and the collision within a predetermined range from a collision position, and limits a running of the vehicle when the vehicle deviates from the range. Since the detection of collision can be performed by a comparatively inexpensive collision sensor (or impact sensor), an increase in cost can be suppressed. In addition, since the repetition of the collision within the range is allowed, it is possible to escape from the danger zone or to perform the French parking. In addition, since the running of the vehicle is limited when the vehicle deviates from the range, a spread of the damage caused by the car rampage can be prevented.

Hereinafter, one embodiment will be described with reference to the drawings.

Figure 1:
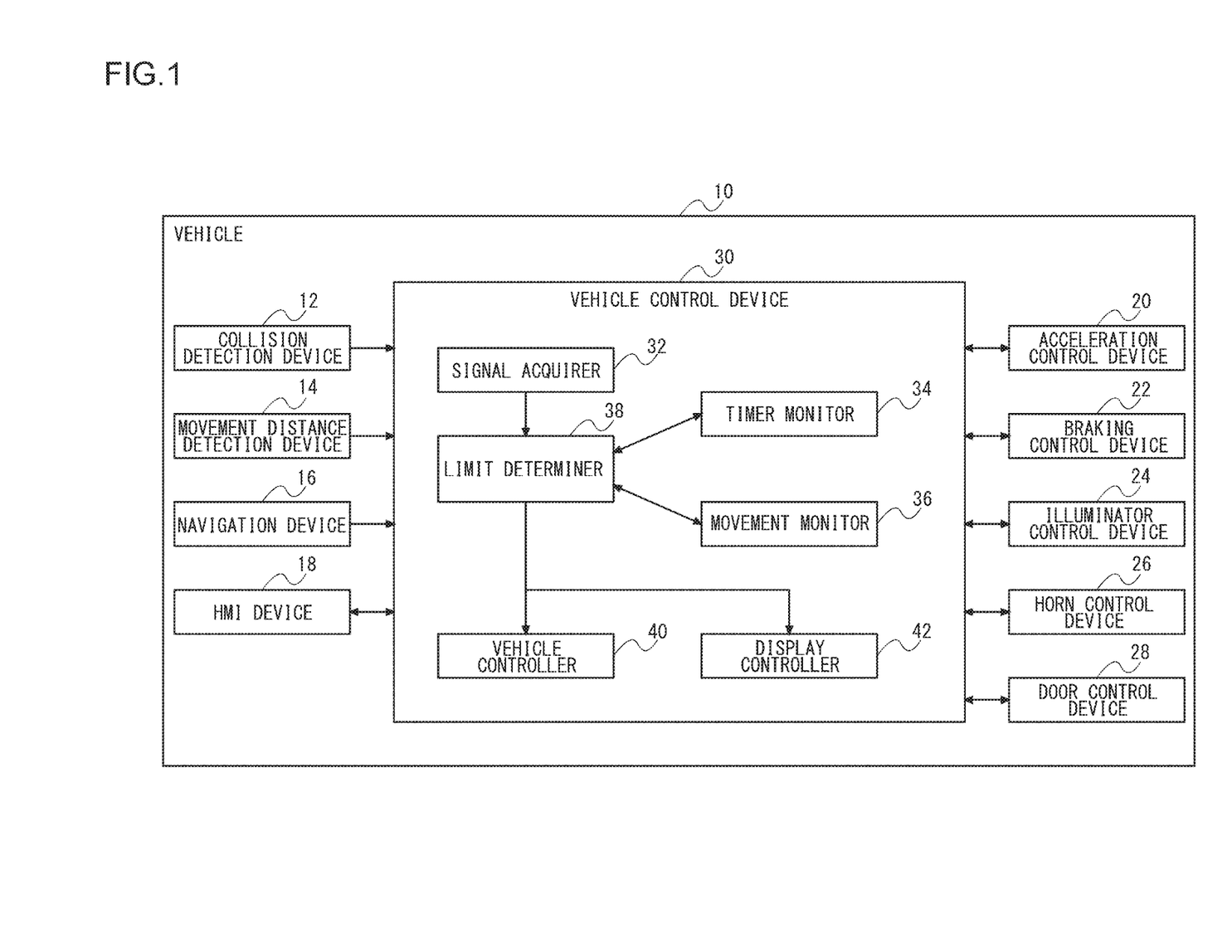
FIG. 1 is a diagram schematically illustrating a configuration of a vehicle according to one embodiment.

FIG. 1 schematically illustrates a configuration of a vehicle 10 according to one embodiment. The vehicle 10 includes a collision detection device 12, a movement distance detection device 14, a navigation device 16, an HMI device 18, an acceleration control device 20, a braking control device 22, an illuminator control device 24, an horn control device 26, a door control device 28, and a vehicle control device 30. At least some of these devices may be implemented as electronic control units (ECUs). In addition, these devices are connected via known onboard networks such as controller area network (CAN), media oriented systems transport (MOST), and universal serial bus (USB).

The collision detection device 12 is a sensor device provided on a bumper (not shown) of the vehicle 10, and detects that the vehicle 10 collides with an object (for example, a pedestrian or another vehicle) outside the vehicle 10. When the collision detection device 12 detects a collision, the collision detection device 12 outputs a collision detection signal, which is a signal representing the collision, to the vehicle control device 30. The collision detection device 12 may be a known sensor equipped as standard in an airbag-equipped vehicle. The movement distance detection device 14 outputs information on the number of rotations and a rotation direction of a tire of the vehicle 10 to the vehicle control device 30.

The navigation device 16 outputs information on the type of road (whether or not it is a trunk road or the like) on which the vehicle 10 runs and the limit speed of the road to the vehicle control device 30. The HMI device 18 provides a user interface for a passenger (hereinafter, referred to as "driver") of the vehicle 10. The HMI device 18 provides information to the driver via voice and display. In addition, the HMI device 18 receives an operation of the driver. The navigation device 16 and the HMI device 18 may be integrated.

The acceleration control device 20 controls acceleration of the vehicle 10. When a running speed of the vehicle 10 exceeds a limit speed specified from the vehicle control device 30, the acceleration control device 20 inhibits acceleration of the vehicle 10. In addition, when the vehicle control device 30 instructs an engine stop (or a motor stop), the acceleration control device 20 stops an engine (or motor). The braking control device 22 controls a brake of the vehicle 10 including a parking brake. When the running speed of the vehicle 10 exceeds the limit speed specified from the vehicle control device 30, the braking control device 22 operates the brake and brakes the vehicle 10.

The illuminator control device 24 controls headlights, tail lamps, and hazard lamps of the vehicle 10, and turns them on in response to the input instructions. The horn control device 26 controls a horn of the vehicle 10 and sounds the horn in response to the input instruction. The door control device 28 controls doors of the vehicle 10, and unlocks the doors, opens the doors, or lowers windows of the doors in response to the input instructions. In addition, the acceleration control device 20, the braking control device 22, the illuminator control device 24, the horn control device 26, and the door control device 28 are devices controlled by the vehicle control device 30 and devices that provide information to the vehicle control device 30. Specifically, the acceleration control device 20 can output vehicle speed information to the onboard network, the braking control device 22 can output brake operation information of the driver to the onboard network, the illuminator control device 24 can output an operation of a hazard lamp switch by the driver to the onboard network, the horn control device 26 can output an operation of the horn by the driver to the onboard network, the door control device 28 can output information on a locked and unlocked state of the door and an opened and closed state of the door to the onboard network, and the vehicle control device 30 can receive the information from the onboard network.

The vehicle control device 30 can also be referred to as a car rampage damage reduction device. The vehicle control device 30 controls a behavior of the vehicle 10 so as to suppress the rampage of the vehicle 10 and permit the movement of the vehicle 10 within a necessary range.

FIG. 1 includes a block diagram illustrating functional blocks of the vehicle control device 30. The vehicle control device 30 includes a signal acquirer 32, a timer monitor 34, a movement monitor 36, a limit determiner 38, a vehicle controller 40, and a display controller 42. Each block shown in the block diagram of the present disclosure can be realized by an element or a mechanical device such as a CPU and a memory of a computer in a hardware manner and can be implemented by a computer program or the like in a software manner, but herein, the functional blocks that are realized by cooperation of the element or mechanical device and the computer program are illustrated. It is understood by those skilled in the art that these functional blocks can be realized in various forms by a combination of hardware and software.

Figure 2:
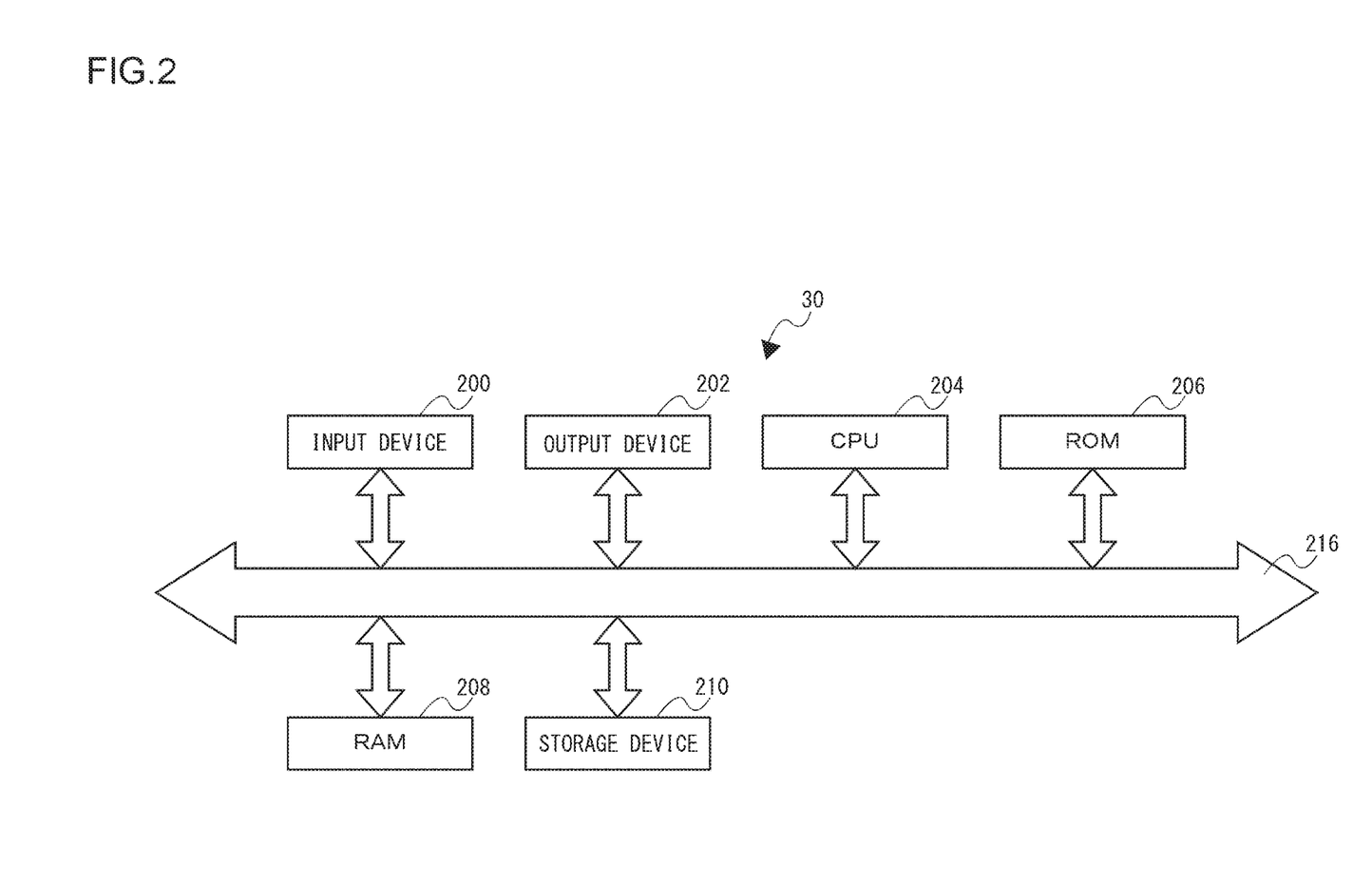
FIG. 2 is a diagram illustrating an example of a hardware configuration of a vehicle control device.

FIG. 2 illustrates an example of a hardware configuration of the vehicle control device 30. The vehicle control device 30 includes an input device 200, an output device 202, a CPU 204, a read only memory (ROM) 206, a random access memory (RAM) 208, and a storage device 210, and these components may be connected to each other through a bus 216.

A computer program including a plurality of modules corresponding to a plurality of functional blocks (to be described below) of the vehicle control device 30 may be stored in the ROM 206 or the storage device 210. The CPU 204 may perform a function of each functional block of the vehicle control device 30 by reading and executing the computer program in the RAM 208.

Returning to FIG. 1, FIG. 1 includes a block diagram illustrating functional blocks of the vehicle control device 30. The vehicle control device 30 includes a signal acquirer 32, a timer monitor 34, a movement monitor 36, a limit determiner 38, a vehicle controller 40, and a display controller 42. Each block shown in the block diagram of the present disclosure can be realized by an element or a mechanical device such as a CPU and a memory of a computer in a hardware manner and can be implemented by a computer program or the like in a software manner, but herein, the functional blocks that are realized by a cooperation of the element or mechanical device and the computer program are illustrated. It is understood by those skilled in the art that these functional blocks can be realized in various forms by a combination of hardware and software.

The signal acquirer 32 acquires the collision detection signal output from the collision detection device 12. The timer monitor 34 counts an elapsed time from an occurrence of various events in response to an instruction from the limit determiner 38, and outputs information on the elapsed time to the limit determiner 38. The movement monitor 36 derives a movement speed, a movement distance, and a movement direction of the vehicle 10, based on the information on the number of rotations and the rotation direction of the tire which is output from the movement distance detection device 14. The movement monitor 36 outputs information on the movement speed, the movement distance, and the movement direction of the vehicle 10 to the limit determiner 38.

The limit determiner 38 controls the timer monitor 34 and the movement monitor 36. In addition, the limit determiner 38 determines whether or not to limit the running of the vehicle 10, based on the collision detection signal acquired by the signal acquirer 32, the elapsed time output from the timer monitor 34, and the movement speed, the movement distance, and the movement direction which are output from the movement monitor 36. In addition, when the running of the vehicle 10 is limited, the limit determiner 38 determines the content of the limit.

The vehicle controller 40 controls the running or the state of the vehicle 10 according to the necessity and the contents of the running limit determined by the limit determiner 38. The display controller 42 notifies the driver of a variety of information on the running limit of the vehicle 10 by controlling the display contents of the HMI device 18 according to the necessity and the contents of the running limit determined by the limit determiner 38. For example, when the running of the vehicle 10 is limited, the display controller 42 notifies the driver of the running limit of the vehicle.

An operation of the vehicle 10 by the above configuration will be described.

Figure 3:
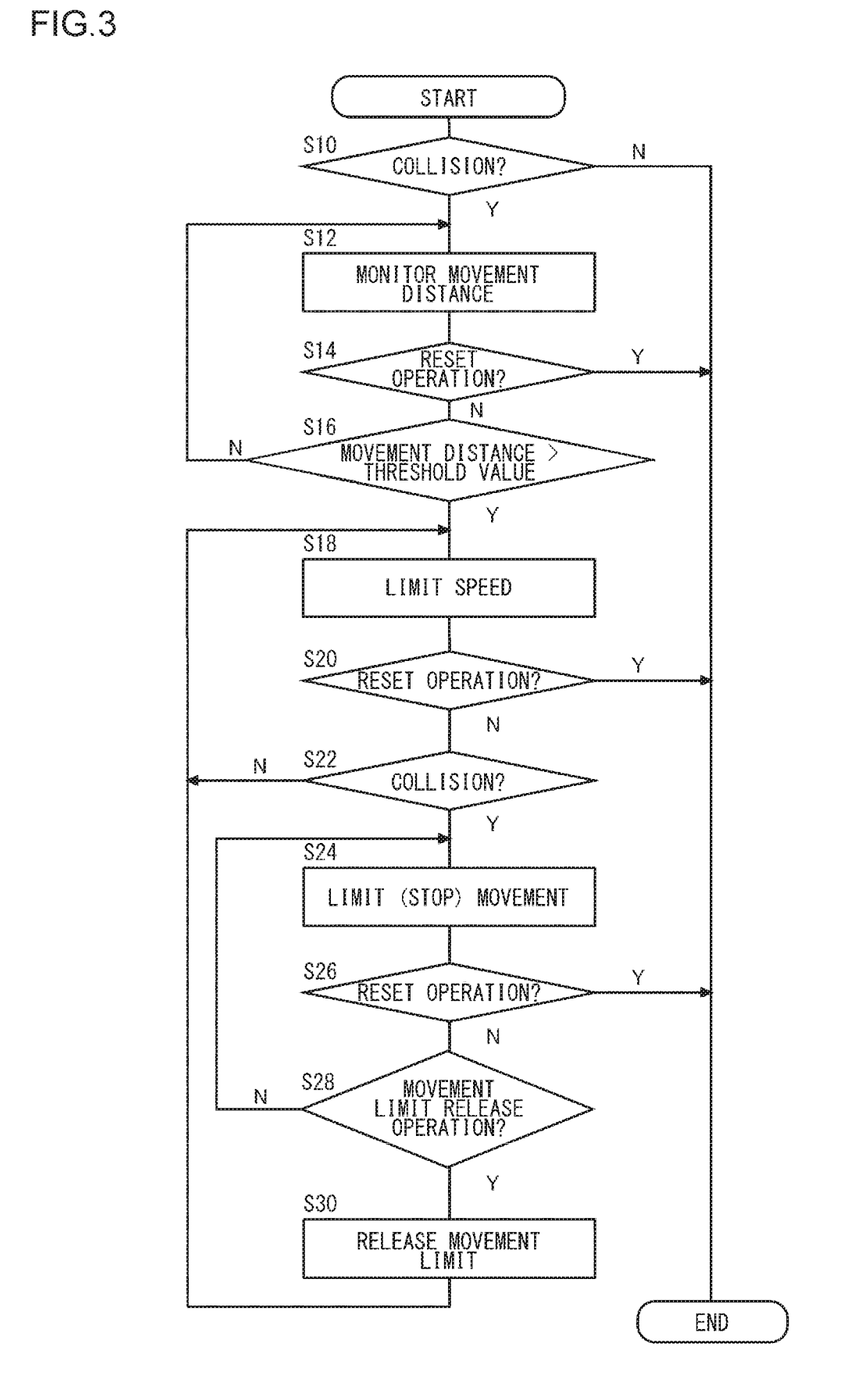
FIG. 3 is a flowchart illustrating an operation of a vehicle according to one embodiment.

FIG. 3 is a flowchart illustrating an operation of the vehicle 10 according to one embodiment. After activation, the vehicle control device 30 constantly waits for the collision detection signal from the collision detection device 12. If the vehicle 10 does not collide with an object outside the vehicle such as a person or another vehicle, that is, if the vehicle control device 30 does not receive the collision detection signal (N in S10), the vehicle control device 30 does not limit the running of the vehicle 10, and the vehicle 10 can run normally. The processing of the present flowchart is repeatedly executed.

If the vehicle 10 collides with the object outside the vehicle (first collision) (Y in S10), the collision detection device 12 detects the collision and outputs the collision detection signal. The signal acquirer 32 of the vehicle control device 30 acquires the collision detection signal and notifies the limit determiner 38 that the collision has been detected. When the collision detection signal is acquired, the limit determiner 38 instructs the movement monitor 36 to start a measurement of a movement distance from a reception time point of the collision detection signal, that is, a movement distance from a collision point (S12). When the movement distance from the collision point becomes long, the display controller 42 causes the HMI device 18 to display a message indicating that the running limit is applied.

If a reset condition is satisfied by the operation (also referred to as "reset operation") of the driver for the vehicle 10 (Y in S14), the vehicle control device 30 returns to a normal state and terminates the flow of the drawing. In this case, the limit determiner 38 and the movement monitor 36 terminate the monitoring of the movement distance of the vehicle 10. The reset operation in the embodiment is an operation for terminating the processing relating to the running limit by the vehicle control device 30. If the reset condition is satisfied, the vehicle control device 30 terminates the processing relating to the running limit of the vehicle 10 and returns to the normal state. The reset conditions in the embodiment are the following two conditions, and the reset conditions are satisfied when at least one of the two conditions is satisfied. In addition, the reset conditions may be one of the following two conditions, or a combination of the two conditions.

(1) In the case which the driver enters an operation to turn off an engine or motor of the vehicle 10 as a reset operation and the engine or motor of the vehicle 10 is continuously turned off for a predetermined time or more. The predetermined time may be, for example, 30 seconds. When it is notified to the acceleration control device 20 that the engine or the motor is turned off, the limit determiner 38 may instruct the timer monitor 34 to measure the duration of turn-off of the engine or the motor. Further, unless specifically stated otherwise, various threshold values described in the present specification may be determined and set appropriately by the developer's knowledge, experience using the vehicle 10, and the like.

(2) Unlocking of the door of the vehicle 10, or opening of the door of the vehicle 10. The limit determiner 38 may detect that the driver unlocks or opens the door of the vehicle 10 by the notification from the door control device 28.

If the reset operation is not input and the reset condition is not satisfied (N in S14), the limit determiner 38 of the vehicle control device 30 determines whether or not the movement distance from the collision point measured by the movement monitor 36 exceeds a predetermined threshold value. If the movement distance is the threshold value or less (N in S16), the flow returns to S12, and the limit determiner 38 repeats the determination. That is, if the movement distance from the collision point is the threshold value or less, the vehicle controller 40 does not limit the running of the vehicle 10.

Figure 4:
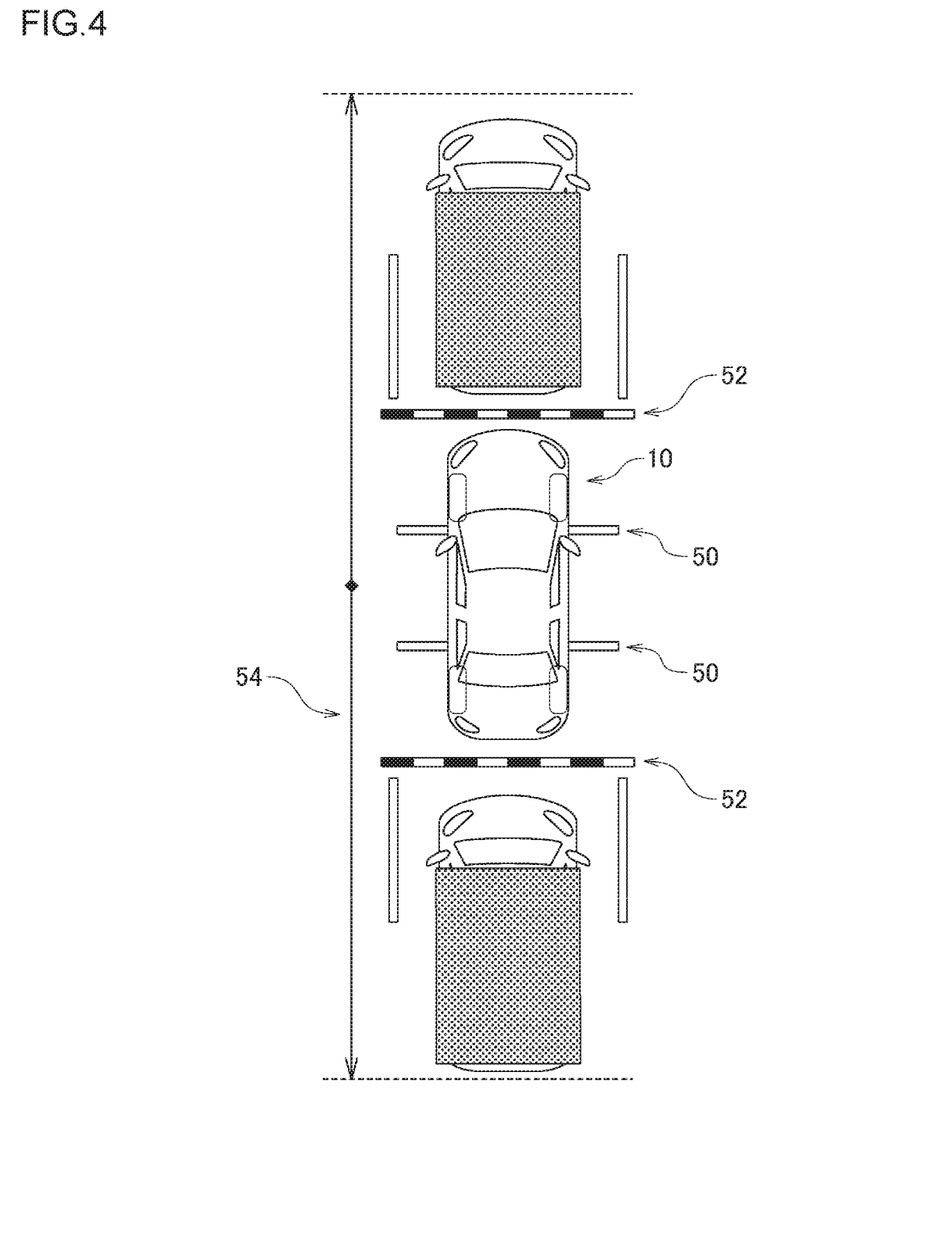
FIG. 4 is a diagram illustrating a situation in which the vehicle stops in a railroad crossing.

The threshold value for the movement distance in the embodiment is a value of 1.5 times or less the total length of the vehicle 10, or 5 meters or less. FIG. 4 illustrates a situation in which the vehicle 10 stops within a railroad crossing. The vehicle 10 in FIG. 4 is in a dangerous state in which the front and rear of the vehicle are sandwiched between crossing gates 52 and the vehicle 10 stops on railway lines 50. In order for the vehicle 10 to escape from the railroad crossing, collision with at least one of other vehicles in front of or behind the vehicle 10 cannot be avoided. Here, the threshold value of the movement distance is set to a value of 1.5 times the total length of the vehicle 10. In this case, even though the vehicle 10 collides with other vehicles, there is no running limit within a range of the threshold value (range 54 in FIG. 4). Thereby, even in a case in which the vehicle 10 is in the danger zone such as within the railway lines, it is possible to escape from the danger zone while the vehicle 10 collides with other vehicles. In addition, it is also possible to escape the vehicle 10 from the French parking.

Further, the movement monitor 36 measures both an advancing distance and a retreating distance of the vehicle 10 from the collision point (in other words, a reception time point of the collision detection signal), and measures a distance obtained by offsetting the advancing distance and the retreating distance as a movement distance from the collision point. The limit determiner 38 compares the distance obtained by offsetting the advancing distance and the retreating distance from the collision point with the threshold value. Thereby, in the situation in FIG. 4, the vehicle 10 can escape from the danger zone while repeating the collision with the crossing gates 52 or other vehicles in front of or behind the own vehicle.

Returning to FIG. 3, if the movement distance from the collision point exceeds the threshold value (Y in S16), the limit determiner 38 determines to limit the running of the vehicle 10. In the embodiment, the limit determiner 38 determines to limit an upper limit of the running speed of the vehicle 10 to a first limit speed. The vehicle controller 40 transmits a command instructing to limit the upper limit of the running speed of the vehicle 10 to the first limit speed to the acceleration control device 20. The acceleration control device 20 controls the vehicle 10 so that a movement speed of the vehicle 10 does not exceed the first limit speed (S18).

The first limit speed is set to a value of 6 km/h or less as a speed slower than a speed at which the person is running. Thereby, even in a case in which the vehicle 10 is in rampage (for example, terrorism or the like), the person in the vicinity of the vehicle 10 is able to run and move away from the vehicle 10. As a result, a spread of the damage caused by the rampage of the vehicle 10 can be suppressed. In addition, since the vehicle 10 can run at the first limit speed or less, the vehicle 10 can move to a road side strip after the accident. That is, it is also possible to secure safety of the vehicle 10.

When the upper limit of the running speed of the vehicle 10 is limited to the first limit speed, the display controller 42 causes the HMI device 18 to display a message indicating the intent of the limitation. If the reset condition is satisfied by the reset operation of the driver to the vehicle 10 (Y in S20), the vehicle control device 30 returns to the normal state, releases the speed limit of the vehicle 10, and terminates the flow shown in the figure, as described above. If the reset condition is not satisfied (N in S20), the limit determiner 38 waits for a new collision detection signal. If the new collision detection signal is not received (N in S22), the flow returns to S18, and maintains a state in which the upper limit of the running speed of the vehicle 10 is limited to the first limit speed.

If the vehicle 10 newly collides with an object outside the vehicle (second collision) (Y in S22), the collision detection device 12 outputs a new collision detection signal. The signal acquirer 32 of the vehicle control device 30 acquires the new collision detection signal. When the new collision detection signal is acquired, the limit determiner 38 determines to limit the running speed of the vehicle 10 to the second limit speed. The second limit speed is a speed slower than the first limit speed, and is 0 in the embodiment. That is, the limit determiner 38 determines to limit the movement of the vehicle 10 (stop in the embodiment) on the basis of the acquisition of the new detection signal. The vehicle controller 40 forcibly stops the vehicle 10 by transmitting a command instructing to brake the vehicle to the braking control device 22 (S24).

When the vehicle 10 is stopped by the vehicle controller 40, the display controller 42 causes the HMI device 18 to display a message indicating the intent of the stop. If the reset condition is satisfied by the reset operation of the driver to the vehicle 10 (Y in S26), the vehicle control device 30 returns to the normal state, releases the movement limit of the vehicle 10, and terminates the flow in the figure, as described above, If the reset condition is not satisfied (N in S26), the limit determiner 38 determines whether or not a first movement limit release condition is satisfied by a movement limit release operation of the driver for the vehicle 10. If the first movement limit release condition is satisfied (Y in S28), the limit determiner 38 determines to release the movement limit. The vehicle controller 40 releases a state in which the vehicle 10 is forcibly stopped by transmitting a command instructing to release the brake to the braking control device 22 (S30). In addition, the flow returns to S18, that is, returns to a state in which the upper limit of the running speed of the vehicle 10 is limited to the first limit speed. If the reset condition is not satisfied and the first movement condition release condition is not satisfied (N in S28), the flow returns to S24 and maintains a state (that is, a stop state) in which the running speed of the vehicle 10 is limited to the second limit speed.

The first movement limit release conditions in the embodiment are the following three conditions, and when at least one of the three conditions is satisfied, the first movement limit release condition is satisfied. In addition, the first movement limit release condition is one of the following three conditions or a combination of the three conditions.

(1) A case in which the driver stops the vehicle 10 as the movement limit release operation (for example, the driver stops the vehicle 10 by operating a footbrake). In addition, a case in which the vehicle 10 has been stopped for a first time or more. The first time may be, for example, 10 seconds. When it is notified from the braking control device 22 that the footbrake has been operated, the limit determiner 38 may instruct the timer monitor 34 to measure the duration of operation of the footbrake.

(2) A case in which the driver operates a parking brake of the vehicle 10 as the movement limit release operation. In other words, a case in which the parking brake of the vehicle 10 operates. The limit determiner 38 detects that the parking brake is operated based on the notification from the braking control device 22.

(3) A case in which the driver turns on a hazard lamp of the vehicle 10 as the movement limit release operation. In other words, a case in which the hazard lamp of the vehicle 10 is turned on. The limit determiner 38 detects that the hazard lamp is turned on based on the notification from the illuminator control device 24. Since these movement limit release operations are reasonable operations from the request of ensuring safety after the collision, the driver is less likely to feel a burden.

When a new collision detection signal is acquired after the first movement limit release condition is satisfied and the movement limit is released (that is, after returning to S18 from Y in S28), the limit determiner 38 and the vehicle controller 40 limits the speed of the vehicle 10 to the second limit speed, that is, stops the vehicle 10. Thereafter, when a second movement limit release condition is satisfied by the movement limit release operation of the driver for the vehicle 10, the movement limit is released (that is, the movement at the first limit speed is allowed). This is a case in which the vehicle 10 collides for a third time after the movement limit is released once.

The time required to satisfy the second movement limit release condition is set to be longer than the time required to satisfy the first movement limit release condition. That is, after the third collision, it takes more time to release the movement limit (stop in the embodiment). As a result, a spread of the damage caused by the rampage of the vehicle 10 can be more effectively suppressed.

For example, the second movement limit release conditions may be the following three conditions corresponding to the first movement limit release conditions. In addition, the second movement limit release condition is one of the following three conditions or a combination of the three conditions.

(1) A case in which the vehicle is continuously stopped for a second time (e.g., 20 seconds) which is longer than the first time in the first movement limit release condition.

(2) A case in which the parking brake of the vehicle 10 operates and the operation of the parking brake is continued for 10 seconds.

(3) A case in which the hazard lamp of the vehicle 10 is turned on and the hazard lamp is turned on for 10 seconds.

The vehicle control device 30 according to the embodiment allows the vehicle 10 to make a normal running and repetitive collision within a predetermined range from the collision point in the case of the first collision. In other words, the vehicle control device 30 counts the second collision after the movement distance from the first collision point exceeds the threshold value. Thereby, it is possible to escape from the danger zone and the French parking. In addition, the vehicle control device 30 limits the speed of the vehicle 10 in a case in which the vehicle 10 is away from the first collision point, and limits the movement itself in a case in which the vehicle 10 repeats the collision after the second collision in a place apart from the first collision point, thereby making it possible to suppress the spread of the damage caused by the rampage of the vehicle 10.

Hereinabove, the present disclosure has been described based on the embodiment. It is understood by those skilled in the art that the embodiment is an example and that various modified examples can be made in the combination of the respective components or the respective processes, and that such modified examples are also within the scope of the present disclosure.

A first modified example will be described. If a predetermined application exclusion condition is satisfied, the limit determiner 38 and the vehicle controller 40 may suppress the limit of the running of the vehicle 10 even in a case in which the movement distance from the collision point exceeds a predetermined threshold value. In addition, a relaxation of increasing the threshold value of the movement distance may also be performed depending on the vehicle speed at the time of the collision.

EXAMPLE 1 OF APPLICATION EXCLUSION

The bumper of the vehicle 10 may be provided with a discrimination function of discriminating whether a collision object is a person or (in other words, a pedestrian) or objects other than the person (other than the pedestrian). The above-mentioned bumper may be realized by a known technology such as the technology described in Jpn. Pat. Appln. KOKAI Publication No. 11-028994. The collision detection device 12 may output the collision detection signal including information indicating whether the collision object is the person or the object other than the person to the vehicle control device 30. When the collision object is the person (i.e., the pedestrian), the limit determiner 38 of the vehicle control device 30 may execute the running limit described in the embodiment. Meanwhile, when the collision object is the object other than the person (i.e., other than the pedestrian), the limit determiner 38 may determine that the application exclusion condition is satisfied, and may suppress the limit of the running of the vehicle 10 regardless of whether or not the vehicle collides. Thereby, in a case in which the vehicle 10 escapes from the danger zone by colliding with other vehicles and pressing other vehicles, the running limit of the vehicle 10 is not applied and safety of the vehicle 10 can be increased.

EXAMPLE 2 OF APPLICATION EXCLUSION

The signal acquirer 32 of the vehicle control device 30 may acquire a signal indicating the running speed of the vehicle 10 which is output from a speed sensor or the like (not shown). When the running speed at the time of collision is a low speed which is less than a predetermined speed threshold value (e.g., 1 km/h), the limit determiner 38 of the vehicle control device 30 may determine that the application exclusion condition is satisfied, and may suppress the limit of the running of the vehicle 10 regardless of whether or not the vehicle 10 collides. When the speed at the time of collision is sufficiently low, it is not necessary to apply the running limit because the possibility of a terrorist vehicle attack or car rampage accident can be eliminated. In a case in which the application exclusion is applied, when the vehicle 10 pushes the vehicles in front of or behind the vehicle 10 for the purpose of escaping from the in-line parking, if the vehicle 10 softly pushes the vehicle of another person so as not to prevent the vehicle of another person from being damaged, the running limit of the vehicle 10 does not operate and a good driver does not thus feel inconvenience.

In addition, a case in which the collision detection device 12 operates when collision occurs during the stop of the own vehicle is also within the scope of the application exclusion. Since it is clear that there is no harmful behavior in case in which the speed of the vehicle 10 is zero, a running limit is not necessary.

EXAMPLE 3 OF APPLICATION EXCLUSION

When a road on which the vehicle 10 is currently running is an motorway (in other words, highway or expressway), the navigation device 16 outputs road type information indicating the motorway to the vehicle control device 30, and the signal acquirer 32 of the vehicle control device 30 may additionally acquire the road type information. When the road on which the vehicle 10 is currently running is the motorway, the limit determiner 38 may determine that the application exclusion condition is satisfied, and may suppress the limit of the running of the vehicle 10 regardless of whether or not the vehicle collides. In other words, when the road on which the vehicle 10 is running at the time of collision with the object is the motorway, the limit determiner 38 may determine that the application exclusion condition is satisfied. Thereby, in a case in which the vehicle 10 is caught in a multiple collision accident on the motorway, it is possible to prevent the vehicle 10 from becoming unavoidable in a safe zone due to the running limit. In addition, since there is no pedestrian on the motorway, it is difficult to increase the damage even if the running limit is suppressed.

In addition, when a road on which the vehicle 10 is currently running is a trunk road, the navigation device 16 outputs road type information indicating the trunk road to the vehicle control device 30, and the signal acquirer 32 of the vehicle control device 30 may additionally acquire the road type information. When the road on which the vehicle 10 is currently running is the trunk road, the limit determiner 38 may determine that the application exclusion condition is satisfied, and may suppress the limit of the running of the vehicle 10 regardless of whether or not the vehicle collides. The trunk road may also include a national expressway, a national road, a major regional road, and a general prefectural road, and in the modified example, the trunk road may be a road with a (upper) limit speed of a predetermined value or more (for example, 60 km/h or more). That is, when the road on which the vehicle 10 is running at the time of collision with the object is the road with the limit speed of the predetermined value or more, the limit determiner 38 may determine that the application exclusion condition is satisfied. Terrorist vehicle attack or car rampage accidents are likely to occur in areas in which pedestrians are likely to become victims and the limit speed is low. For this reason, the necessity to force the inconvenience caused by the running limit is low on the trunk road with a high limit speed.

Example of Relaxation of Threshold Value of Movement Distance

The movement monitor 36 of the vehicle control device 30 may always detect the running speed of the vehicle 10. Alternatively, the signal acquirer 32 of the vehicle control device 30 may acquire a signal indicating the running speed of the vehicle 10 which is output from a speed sensor or the like (not shown). When the running speed of the vehicle 10 at the time of collision exceeds a predetermined speed threshold value (e.g., 50 km/h), the limit determiner 38 of the vehicle control device 30 may increase the distance from the collision point at which the running limit of the vehicle 10 is triggered. For example, when a running limit triggering distance in a collision occurring during a low speed running of the speed threshold value or less is 5 meters, the running limit triggering distance in a collision occurring during a high speed running exceeding the speed threshold value may be 10 meters. The reason for this is that, in the case of the collision during high speed running, when the running limit triggering distance is short, the vehicle 10 immediately exceeds the running limit triggering distance and the running limit is applied, and as a result, measures such as placing the vehicle 10 on a road side strip may be delayed.

A second modified example will be described. When the speed of the vehicle 10 is limited to the second limit speed, the vehicle controller 40 of the vehicle control device 30 may transmit a command instructing to unlock the door of the vehicle 10 together with the restriction to the door control device 28. The door control device 28 may unlock the door of the vehicle 10 according to the command. The second limit speed is a low speed, and in the embodiment, the vehicle 10 is stopped. Therefore, by releasing the door when limiting the speed of the vehicle 10 to the second limit speed, it is possible for a person in the vicinity of the vehicle 10 repeating the collision to counterattack against the driver.

A third modified example will be described. When the vehicle 10 runs without collision for more than a predetermined time, or more than a predetermined distance, the limit determiner 38 and the vehicle controller 40 of the vehicle control device 30 may release the running limit imposed on the vehicle 10. Specifically, the limit determiner 38 may cause the timer monitor 34 to measure an elapsed time after the speed of the vehicle 10 is limited to the first limit speed. In addition, the limit determiner 38 may cause the movement monitor 36 to measure a movement distance after the speed of the vehicle 10 is limited to the first limit speed. When the elapsed time measured by the timer monitor 34 exceeds a predetermined threshold value (for example, one minute) while the new collision detection signal is not received, the limit determiner 38 may release all the running limits for the vehicle 10. And/or, when the movement distance measured by the movement monitor 36 exceeds a predetermined threshold value (for example, 500 meters) while the new collision detection signal is not received, the limit determiner 38 may release all the running limits for the vehicle 10. Further, the present modified example can also be applied to a case in which the speed of the vehicle 10 is limited to the second limit speed (not stop) that is slower than the first limit speed.

In addition, the reset condition of the vehicle control device 30 may include that the vehicle 10 runs without collision for more than a predetermined time, or more than a predetermined distance in addition to the contents described in the embodiment. When the reset condition described in the embodiment is satisfied, or the vehicle 10 runs without collision for more than a predetermined time, or more than a predetermined distance, the limit determiner 38 and the vehicle controller 40 of the vehicle control device 30 may release the running limit imposed on the vehicle 10.

A fourth modified example will be described. In the above embodiment, the vehicle 10 is forcibly stopped at the second or subsequent collision, but as a modified example, the running limit may be enhanced by other modes (or a combination with other modes). For example, the time required to release the running limit (for example, satisfy the reset condition and/or satisfy the movement limit release condition) may be increased. In addition, as described in the second modified example, the vehicle controller 40 may forcibly unlock the door of the vehicle 10. In addition, the vehicle controller 40 may forcibly operate the horn of the vehicle 10. In addition, the vehicle controller 40 may forcibly turn on the illuminator of the vehicle 10 (for example, the headlight or the hazard lamp). In addition, the vehicle controller 40 may forcibly stop the engine or the motor of the vehicle 10 (but, the display controller 42 continues a notification operation to the driver for a predetermined time). Thereby, the person in the vicinity of the vehicle 10 can be informed of an abnormal state of the vehicle 10, and warning and evacuation can be urged. In addition, it is possible to prevent the rampaged vehicle 10 from escaping.

A fifth modified example will be described. The vehicle 10 may have a configuration that does not include the navigation device 16, the illuminator control device 24, the horn control device 26, and the door control device 28. In addition, the collision detection device 12 is preferably provided on both the front and rear bumpers of the vehicle 10, but it may be provided only on the front bumper. In addition, even the case in which the collision detection device 12 is provided on both of the front and rear bumpers of the vehicle 10, a collision of the rear bumper may not be counted. This is because the vehicle speed is lowered when the vehicle 10 is retreating, and the extent and range of damage are limited.

With respect to the function of assisting the assault from the outside of the vehicle (counterattack), such as forcibly stopping the vehicle, unlocking the door, and lowering the window in the second collision described in the above embodiment or the modified examples, it is preferable that the implementation or the implementation content is determined depending on the type of vehicle (private car, lorry or bus, etc.) to which the technology of the present embodiment or the modified example is applied, and the situation of the country or region (security, etc.). For example, when a structure capable of forcibly stopping the vehicle by kicking the front or rear bumper is mounted on the vehicle, ordinary pedestrians will be able to prevent the spread of terrorist vehicle attack or car rampage accidents, but such a structure may also be abused as a means of stopping the vehicle for a robber to rob the vehicle. That is, it is desirable for society to decide what should be prioritized in the implementation.

Any combination of the embodiments and modified examples described above is also useful as one embodiment of the present disclosure. A new embodiment that results from the combination will have the same effect as each of the combined embodiments and modified examples. In addition, it is also understood by those skilled in the art that the functions to be fulfilled by each of the components described in the claims are realized by a single element or cooperation of each of the components shown in the embodiments and the modified examples. For example, the controller described in the claims may be realized by the cooperation between the limit determiner 38 and the vehicle controller 40 described in the embodiment.

The technology described in the embodiments and the modified examples may be specified by the following articles.

Article 1

A vehicle control device including:

a receiver structured to receive a detection signal indicating that a vehicle collides with an object from a collision detection device mounted in the vehicle, a monitor structured to measure a distance that the vehicle moves from a collision point when the receiver receives the detection signal, and a controller structured to limit a running of the vehicle when the distance measured by the monitor exceeds a predetermined threshold value, and not to limit the running of the vehicle when the distance is the threshold value or less.

According to the vehicle control device, the running of the vehicle is not limited in a range close to the collision point, and the running of the vehicle is limited when the vehicle is moved away from the collision point. Thereby, it is possible for the vehicle to escape from a danger zone such as a railroad crossing or the like, or a French parking, and a spread of damage caused by a rampage of the vehicle can be suppressed.

Article 2

The vehicle control device according to article 1, wherein the controller limits the running of the vehicle by limiting a speed of the vehicle, and the controller limits the speed of the vehicle to a second speed lower than a predetermined first speed when a new detection signal is acquired after limiting the speed of the vehicle to the first speed.

According to the vehicle control device, the spread of the damage caused by the rampage of the vehicle can be suppressed by further lowering the speed of the vehicle when the vehicle repeats the collision.

Article 3

The vehicle control device according to article 2, wherein the controller limits the speed of the vehicle to the second speed and performs control to implement an unlocking of a door of the vehicle, an operation of a horn of the vehicle, or a turn-on of a headlight or hazard lamp of the vehicle, or a combination thereof.

According to the vehicle control device, it is possible for a person in the vicinity of the vehicle to counterattack against a driver of the vehicle by unlocking the door of the vehicle when the vehicle repeats the collision, or the attention of the person in the vicinity of the vehicle can be evoked by operating the horn or illuminator.

Article 4

The vehicle control device according to article 2 or 3, wherein the second speed limited by the controller is a speed at which the vehicle is stopped.

According to the vehicle control device, the spread of the damage caused by the car rampage can be suppressed by stopping the vehicle when the vehicle repeats the collision.

Article 5

The vehicle control device according to any one of articles 2 to 4, wherein the controller allows the vehicle to be moved at the first speed when a first condition is satisfied by an operation of the driver for the vehicle after limiting the speed of the vehicle to the second speed.

According to the vehicle control device, the driver can relax a speed limit of the vehicle by own operation, for example, release a state in which the vehicle is forcibly stopped.

Article 6

The vehicle control device according to article 5, wherein the first condition is any of a brake operation, a parking brake operation, or a hazard lamp operation for a predetermined time or more, or a combination thereof.

According to the vehicle control device, the spread of the damage caused by car rampage can be suppressed without imposing an excessive burden on the driver by imposing an appropriate operation input to the driver in view of a request for ensuring safety after the collision.

Article 7

The vehicle control device according to article 5 or 6, wherein the controller limits the speed of the vehicle to the second speed when a new detection signal is acquired after the first condition is satisfied and the movement at the first speed is allowed, and again allows the movement at the first speed when a second condition is satisfied by an operation of the driver for the vehicle, and a time required to satisfy the second condition is longer than a time required to satisfy the first condition.

According to the vehicle control device, when the vehicle repeats collision, by increasing the time required to relax the speed limit of the vehicle, for example, a stop time of the vehicle becomes long, so that the people in the vicinity of the vehicle can be evacuated. Thereby, the spread of the damage caused by the car rampage can be suppressed.

Article 8

The vehicle control device according to any one of articles 2 to 7, wherein the first speed is a value of 6 km/h or less.

According to the vehicle control device, even in case of car rampage, since the people in the vicinity of the vehicle can run away, the spread of the damage caused by the car rampage can be suppressed.

Article 9

The vehicle control device according to any one of articles 1 to 8, wherein the threshold value is a value of 1.5 times or less the total length of the vehicle, or 5 meters or less.

According to the vehicle control device, since the running of the vehicle is not limited in the range required to escape from the danger zone or the in-line parking, it is possible for the vehicle to escape from the danger zone or the in-line parking.

Article 10

The vehicle control device according to any one of articles 1 to 9, wherein the monitor measures a distance obtained by offsetting an advancing distance and a retreating distance of the vehicle from the collision point.

According to the vehicle control device, by measuring a distance that the vehicle is substantially away from the collision point, it is possible for the vehicle to move back and forth and escape from the danger zone or the in-line parking.

Article 11

The vehicle control device according to any one of articles 1 to 10, further comprising: a notifier structured to notify the driver that the running limit is to be applied in a case in which the movement distance from the collision point becomes long when the receiver receives the detection signal, or notify the driver that the running of the vehicle is limited when the running of the vehicle is limited.

According to the vehicle limit device, it is possible to urge the driver to pay attention to driving and to input an operation of releasing the running limit when the running of the vehicle is limited.

Article 12

The vehicle control device according to any one of articles 1 to 11, wherein the controller release the running limit imposed on the vehicle when a release condition is released by an operation of the driver for the vehicle.

According to the vehicle control device, when the driver inputs an appropriate operation of stopping the car rampage, the running limit of the vehicle can be released.

Article 13

The vehicle control device according to article 12, wherein the release condition is any one of a condition that the engine or motor of the vehicle is turned off for a predetermined time or more, the door of the vehicle is unlocked, the door of the vehicle is opened, or a combination thereof.

According to the vehicle control device, when the driver inputs an appropriate operation of stopping the car rampage, the running limit of the vehicle can be released.

Article 14

The vehicle control device according to any one of articles 1 to 13, wherein the controller releases the running limit imposed on the vehicle when the vehicle runs without collision for more than a predetermined time, or more than a predetermined distance, after limiting the speed of the vehicle to the predetermined first speed.

According to the vehicle control device, when it is confirmed that the vehicle is normally driving, an unnecessary running limit can be released.

Article 15

The vehicle control device according to any one of articles 1 to 14, wherein when a predetermined exclusion condition is satisfied, the controller does not limit the running of the vehicle even in a case in which the distance measured by the monitor exceeds the threshold value.

According to the vehicle control device, an application of the running limit of the vehicle can be excluded depending on a collision situation or an environment in the vicinity of the vehicle.

Article 16

The vehicle control device according to article 15, wherein the collision detection device mounted in the vehicle includes a function of detecting whether a collision object is a pedestrian or an object other than the pedestrian, and when the collision detection device detects that the collision object is the object other than the pedestrian, the controller determines that the predetermined exclusion condition is satisfied.

According to the vehicle control device, when the vehicle pushes other vehicles and escapes from the danger zone, the running limit is not applied to the vehicle and safety of the vehicle can be increased.

Article 17

The vehicle control device according to article 15, wherein the controller acquires information on the vehicle speed, and determines that the predetermined exclusion condition is satisfied when the vehicle speed at which the vehicle collides with the object is less than a predetermined value.

When the speed at the time of collision is sufficiently low, it is not necessary to apply the running limit because the possibility of terrorist vehicle attack or car rampage accident can be eliminated. According to the vehicle control device, when the vehicle pushes vehicles in front of or behind the vehicle for the purpose of escaping from the in-line parking, it is possible to control so as not to apply the running limit when the vehicle pushes softly so as not to damage the vehicles of the other person.

Article 18

The vehicle control device according to article 15, wherein the controller acquires information on a road on which the vehicle is running, and determines that the predetermined exclusion condition is satisfied when the road on which the vehicle is running when the vehicle collides with the object is a motorway, or a road whose limit speed is a predetermined value or more.

Terrorist vehicle attack and serious car rampage accidents are likely to occur in areas in which pedestrians are likely to become victims and the limit speed is low. According to the vehicle control device, it is possible to avoid imposing inconvenience caused by the running limit on a trunk road with a high limit speed.

Article 19

A vehicle control method executed by a computer, including:

receiving a detection signal indicating that a vehicle collides with an object from a collision detection device mounted in the vehicle, measuring a distance that the vehicle moves from a collision point when the detection signal is received, and limiting a running of the vehicle when the movement distance exceeds a predetermined threshold value, and not limiting the running of the vehicle when the movement distance is the threshold value or less.

According to the vehicle control method, the running of the vehicle is not limited in a range close to the collision point, and the running of the vehicle is limited when the vehicle is moved away from the collision point. Thereby, it is possible for the vehicle to escape from a danger zone such as a railroad crossing or the like, or a French parking, and a spread of damage caused by a car rampage can be suppressed.

Article 20

A computer program for causing a computer to execute operations, wherein the operations include:

receiving a detection signal indicating that a vehicle collides with an object from a collision detection device mounted in the vehicle, measuring a distance that the vehicle moves from a collision point when the detection signal is received, and limiting a running of the vehicle when the movement distance exceeds a predetermined threshold value, and not limiting the running of the vehicle when the movement distance is the threshold value or less.

According to the computer program, the running of the vehicle is not limited in a range close to the collision point, and the running of the vehicle is limited when the vehicle is moved away from the collision point. Thereby, it is possible for the vehicle to escape from a danger zone such as a railroad crossing or the like, or a French parking, and a spread of damage caused by a car rampage can be suppressed.

What is claimed is:

1. A vehicle control device comprising:
a receiver configured to receive a detection signal indicating that a vehicle collides with an object from a collision detection device mounted in the vehicle; and
a processor configured
to measure a distance that the vehicle moves from a collision point when the receiver receives the detection signal; and
to limit a running of the vehicle when the distance measured exceeds a predetermined threshold value, and not to limit the running of the vehicle when the distance is the threshold value or less, wherein
the processor limits the running of the vehicle by limiting a moving speed of the vehicle to a first speed, and
the processor limits the moving speed of the vehicle to a second speed that is lower than the first speed, when a new detection signal is acquired after limiting the moving speed of the vehicle to the first speed.

2. The vehicle control device according to claim 1, wherein the processor limits the moving speed of the vehicle to the second speed and performs control to implement an unlocking of a door of the vehicle, an operation of a horn of the vehicle, or a turn-on of a headlight or hazard lamp of the vehicle, or a combination thereof.

3. The vehicle control device according to claim 1, wherein the second speed limited by the processor is a speed at which the vehicle is stopped.

4. The vehicle control device according to claim 1, wherein the processor allows the vehicle to be moved at the first speed when a first condition is satisfied by an operation of a driver for the vehicle after limiting the moving speed of the vehicle to the second speed.

5. The vehicle control device according to claim 4, wherein the first condition is any of a brake operation, a parking brake operation, or a hazard lamp operation for a predetermined time or more, or a combination thereof.

6. The vehicle control device according to claim 4, wherein the processor limits the moving speed of the vehicle to the second speed when the new detection signal is acquired after the first condition is satisfied and the movement at the first speed is allowed, and again allows the movement at the first speed when a second condition is satisfied by an operation of the driver for the vehicle, and
a time required to satisfy the second condition is longer than a time required to satisfy the first condition.

7. The vehicle control device according to claim 1, wherein the first speed is a value of 6 km/h or less.

8. The vehicle control device according to claim 1, wherein the threshold value is a value of 1.5 times or less the total length of the vehicle, or 5 meters or less.

9. The vehicle control device according to claim 1, wherein the processor measures a distance obtained by offsetting an advancing distance and a retreating distance of the vehicle from the collision point.

10. The vehicle control device according to claim 1, wherein the processor is further configured to notify the driver that the running limit is to be applied in a case in which the movement distance from the collision point becomes long when the receiver receives the detection signal, or notify the driver that the running of the vehicle is limited when the running of the vehicle is limited.

11. The vehicle control device according to claim 1, wherein the processor releases the running limit imposed on the vehicle when a release condition is satisfied by an operation of the driver for the vehicle.

12. The vehicle control device according to claim 11, wherein the release condition is any one of a condition that the engine or motor of the vehicle is turned off for a predetermined time or more, the door of the vehicle is unlocked, or the door of the vehicle is opened, or a combination thereof.

13. The vehicle control device according to claim 1, wherein the processor releases the running limit imposed on the vehicle when the vehicle runs without collision for more than a predetermined time, or more than a predetermined distance, after limiting the moving speed of the vehicle to the first speed.

14. The vehicle control device according to claim 1, wherein when a predetermined exclusion condition is satisfied, the processor does not limit the running of the vehicle even in a case in which the distance measured by the processor exceeds the threshold value.

15. The vehicle control device according to claim 14, wherein the collision detection device mounted in the vehicle includes a function of detecting whether a collision object is a pedestrian or an object other than the pedestrian, and
when the collision detection device detects that the collision object is the object other than the pedestrian, the processor determines that the predetermined exclusion condition is satisfied.

16. The vehicle control device according to claim 14, wherein the processor acquires information on the moving speed of the vehicle, and determines that the predetermined exclusion condition is satisfied when the moving speed at which the vehicle collides with the object is less than a predetermined value.

17. The vehicle control device according to claim 14, wherein the processor acquires information on a road on which the vehicle is running, and determines that the predetermined exclusion condition is satisfied when the road on which the vehicle is running when the vehicle collides with the object is a motorway, or a road whose limit speed is a predetermined value or more.

18. A vehicle control method executed by a computer, comprising:
receiving, by a receiver, a detection signal indicating that a vehicle collides with an object from a collision detection device mounted in the vehicle;
measuring, by a processor, a distance that the vehicle moves from a collision point when the detection signal is received; and
limiting, by the processor, a running of the vehicle when the movement distance exceeds a predetermined threshold value, and not limiting the running of the vehicle when the movement distance is the threshold value or less,
wherein the running of the vehicle is limited by limiting a moving speed of the vehicle to a first speed, and
wherein the moving speed of the vehicle is limited to a second speed that is lower than the first speed, when a new detection signal is acquired after limiting the moving speed of the vehicle to the first speed.

19. A non-transitory recording medium having a computer program stored on the recording medium, the computer program causing a computer to execute operations, wherein the operations include:
receiving a detection signal indicating that a vehicle collides with an object from a collision detection device mounted in the vehicle;
measuring a distance that the vehicle moves from a collision point when the detection signal is received; and
limiting a running of the vehicle when the movement distance exceeds a predetermined threshold value, and not limiting the running of the vehicle when the movement distance is the threshold value or less,
wherein the running of the vehicle is limited by limiting a moving speed of the vehicle to a first speed, and
wherein the moving speed of the vehicle is limited to a second speed that is lower than the first speed, when a new detection signal is acquired after limiting the moving speed of the vehicle to the first speed.

* * * * *